United States Patent
Horiuchi et al.

(10) Patent No.: US 10,186,253 B2
(45) Date of Patent: Jan. 22, 2019

(54) CONTROL DEVICE FOR RECORDING SYSTEM, AND RECORDING SYSTEM

(71) Applicant: OLYMPUS CORPORATION, Hachioji-shi, Tokyo (JP)

(72) Inventors: Tadashi Horiuchi, Hino (JP); Teruo Tomita, Fuchu (JP); Seiji Tatsuta, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 127 days.

(21) Appl. No.: 15/286,085

(22) Filed: Oct. 5, 2016

(65) Prior Publication Data
US 2017/0098449 A1 Apr. 6, 2017

(30) Foreign Application Priority Data

Oct. 5, 2015 (JP) .................................. 2015-197698
Oct. 5, 2015 (JP) .................................. 2015-197699

(51) Int. Cl.
| | |
|---|---|
| G10L 15/06 | (2013.01) |
| G10L 15/02 | (2006.01) |
| G10L 15/26 | (2006.01) |
| H04N 5/77 | (2006.01) |
| H04N 9/82 | (2006.01) |

(52) U.S. Cl.
CPC .............. G10L 15/02 (2013.01); G10L 15/26 (2013.01); H04N 5/77 (2013.01); H04N 9/8211 (2013.01)

(58) Field of Classification Search
CPC ..... G10L 15/265; G10L 17/005; G10L 15/02; G10L 15/26; H04N 9/8211; H04N 5/77
See application file for complete search history.

(56) References Cited

U.S. PATENT DOCUMENTS

| | | | | |
|---|---|---|---|---|
| 6,026,686 A | * | 2/2000 | Hattori | G01N 29/045 702/56 |
| 6,880,403 B1 | * | 4/2005 | Shimada | G01M 7/00 73/600 |
| 2005/0114081 A1 | * | 5/2005 | Fukui | G01N 29/14 702/182 |
| 2005/0223804 A1 | * | 10/2005 | Nakamura | G01L 5/246 73/581 |
| 2006/0221877 A1 | * | 10/2006 | Belanger | G01M 3/226 370/310 |
| 2008/0144927 A1 | * | 6/2008 | Hashimoto | G01N 29/045 382/156 |

(Continued)

FOREIGN PATENT DOCUMENTS

| | | |
|---|---|---|
| JP | 2002340870 A | 11/2002 |
| JP | 2013521567 A | 6/2013 |

*Primary Examiner* — Tung T Vo
(74) *Attorney, Agent, or Firm* — Volpe and Koenig, P.C.

(57) ABSTRACT

A control device for a recording system includes a sound acquisition unit, a recording control unit, an item management unit and a presentation control unit. The sound acquisition unit acquires sound data from a sound pickup device. The recording control unit records information based on the sound data as recording information corresponding to one of predetermined items. The item management unit extracts one of the items, in which the recording information has not yet been recorded, as an uninput item. The presentation control unit causes a presentation device to show the uninput item.

10 Claims, 13 Drawing Sheets

(56) References Cited

U.S. PATENT DOCUMENTS

| | | | | |
|---|---|---|---|---|
| 2010/0308969 | A1* | 12/2010 | Okada | G01D 5/48 340/10.1 |
| 2012/0051561 | A1* | 3/2012 | Cohen | G10L 21/00 381/122 |
| 2012/0062731 | A1* | 3/2012 | Enomoto | G01B 11/245 348/140 |
| 2012/0121103 | A1* | 5/2012 | Cohen | H04R 1/1083 381/77 |
| 2016/0225389 | A1* | 8/2016 | Jinnai | G10L 25/84 |
| 2017/0160238 | A1* | 6/2017 | Etoh | G01N 29/045 |
| 2017/0227501 | A1* | 8/2017 | Matsunaga | G01N 29/12 |
| 2017/0343516 | A1* | 11/2017 | Matsunaga | G01N 29/04 |

* cited by examiner

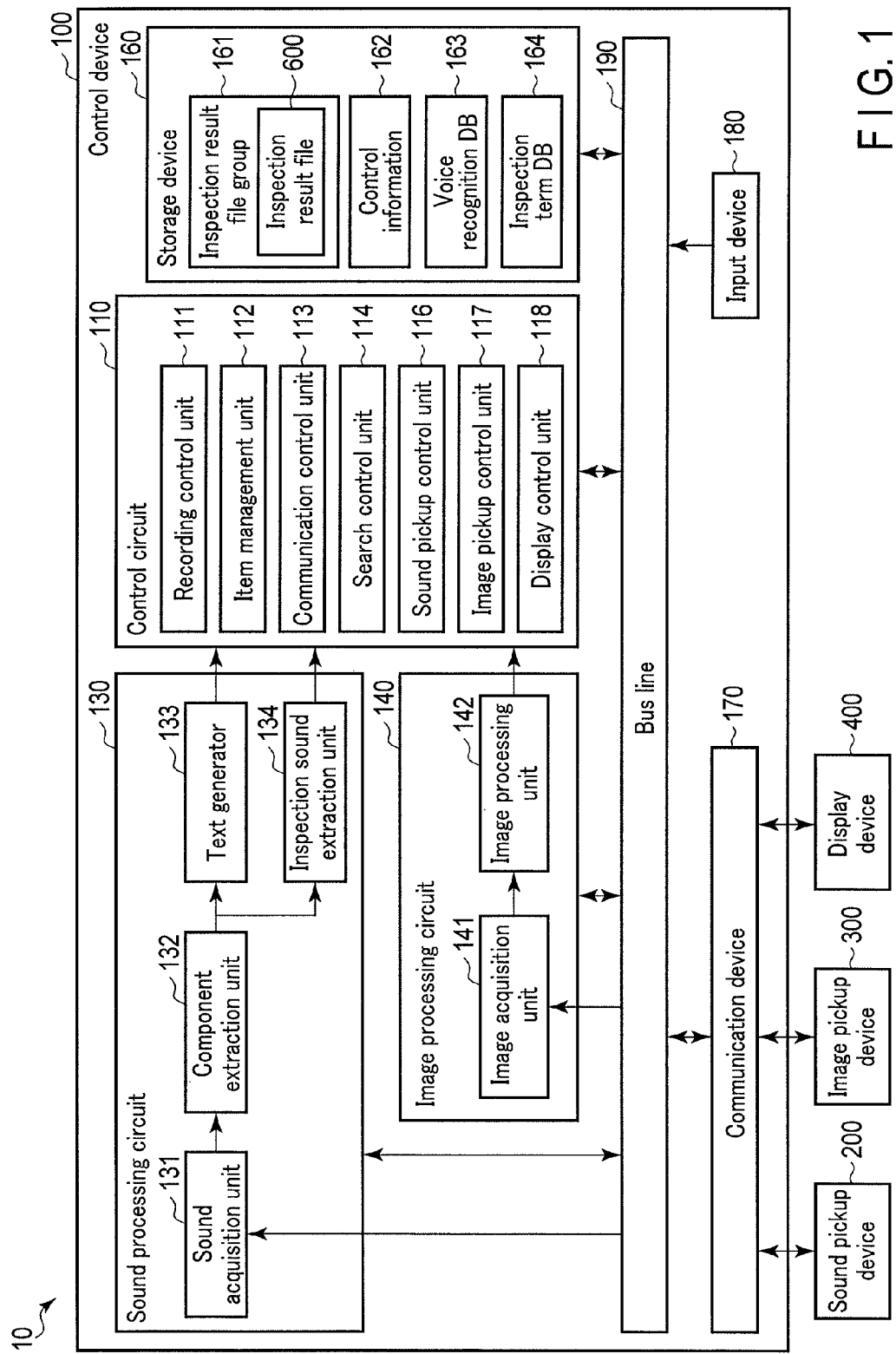
F I G. 1

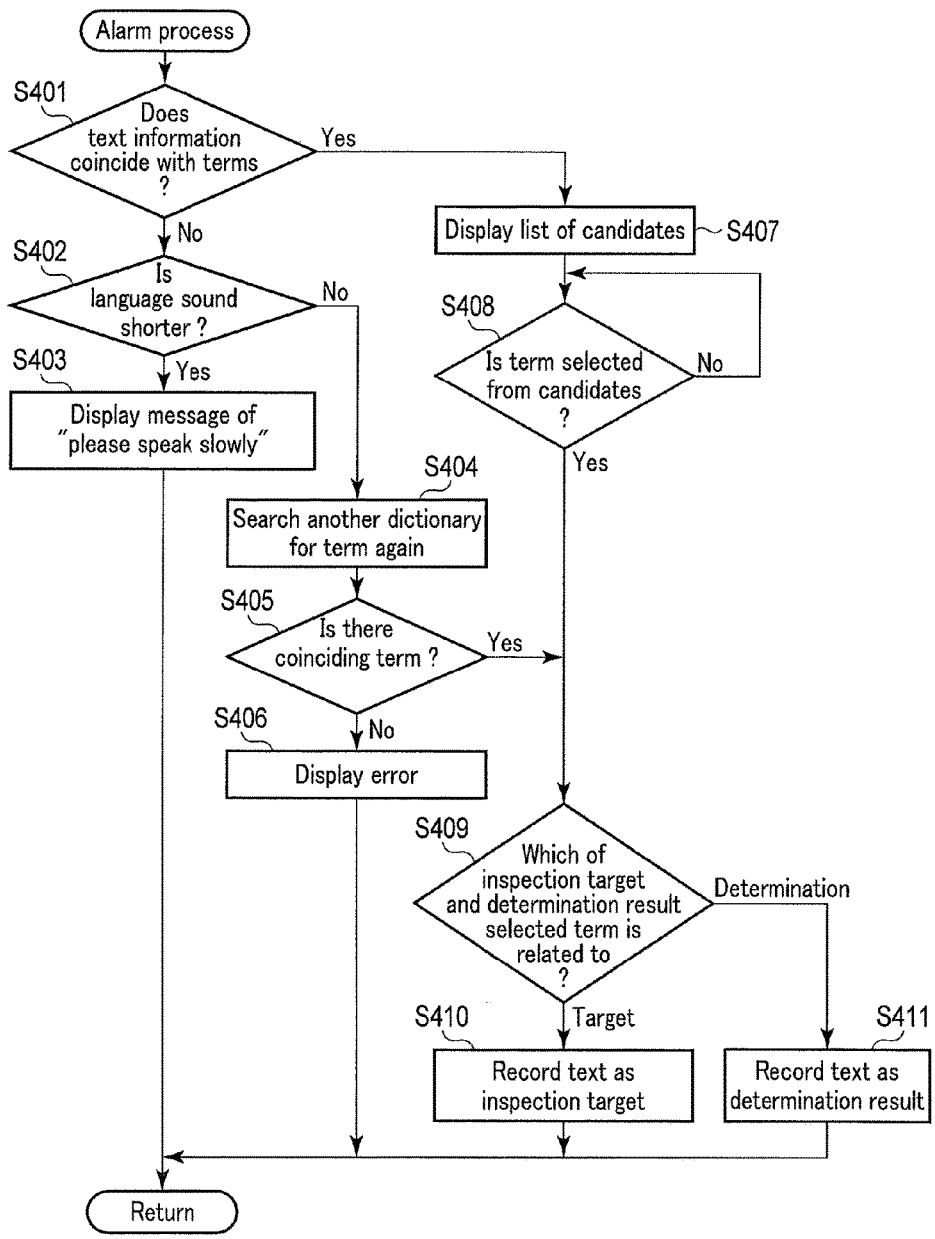
F I G. 11

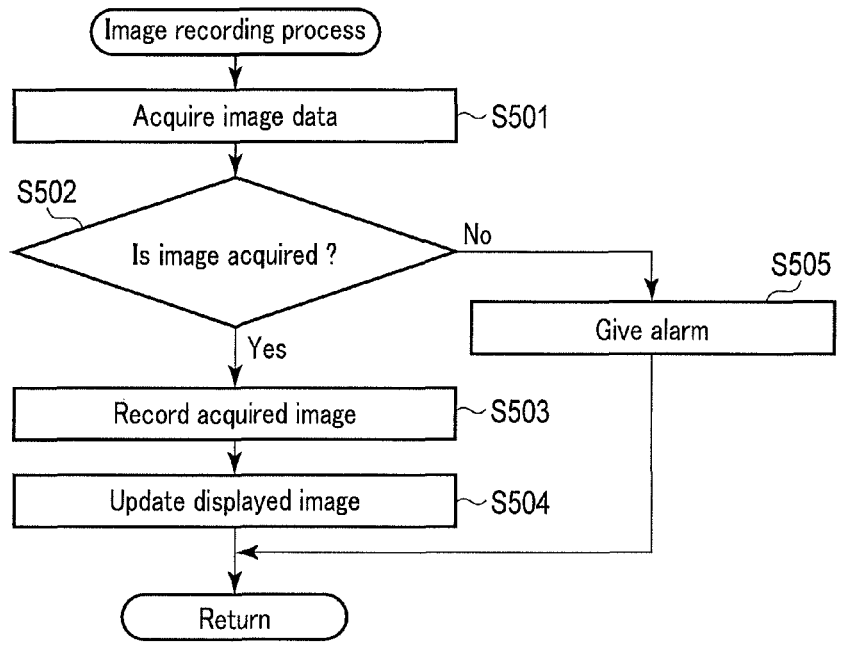
F I G. 12
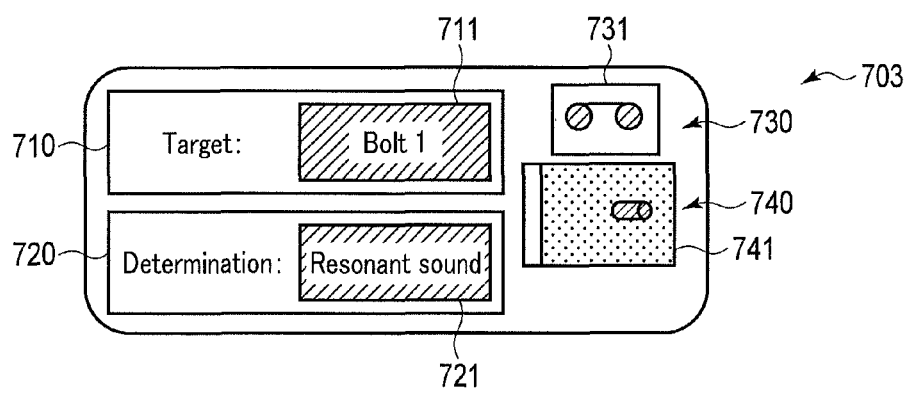
F I G. 13

CONTROL DEVICE FOR RECORDING SYSTEM, AND RECORDING SYSTEM

CROSS-REFERENCE TO RELATED APPLICATIONS

This application is based upon and claims the benefit of priority from prior Japanese Patent Applications No. 2015-197698, filed Oct. 5, 2015, and No. 2015-197699, filed Oct. 5, 2015, the entire contents of which are incorporated herein by reference.

BACKGROUND OF THE INVENTION

1. Field of the Invention

The present invention relates to a control device for a recording system, and a recording system.

2. Description of the Related Art

In general, it may be useful to record a plurality of information items in association with one another. For example, Jpn. Pat. Appln. KOKAI Publication No. 2013-521567 discloses a technology of adding a voice tag to an image. In this technology, linguistic information created by the voice recognition technology is associated with an image. Jpn. Pat. Appln. KOKAI Publication No. 2013-521567 also discloses using a database in which voice tags are recorded when the voice tags are associated with images.

Jpn. Pat. Appln. KOKAI Publication No. 2002-340870 discloses a technology of analyzing a hammering sound in a hammering test that is conducted to find a defect in concrete. Jpn. Pat. Appln. KOKAI Publication No. 2002-340870 also discloses a technology of detecting a defect by analyzing a hammering sound using the fact that the frequency of a hammering sound of a defective portion is lower than that of a hammering sound of a non-defective portion.

As a road tunnel inspection method, the following method is known. An inspector hits a test object with a hammer and records whether the hammering sound is a resonant sound or a non-resonant sound. The inspector also records whether he or she feels a response to the hit. Furthermore, the inspector gets close to adhesive bolts and visually inspects them, and hits and touch the bolts to determine whether they are defective or non-defective and take pictures of them. Inspection results and pictures are collected as a recording table.

BRIEF SUMMARY OF THE INVENTION

According to an aspect of the invention, a control device for a recording system includes a sound acquisition unit which acquires sound data from a sound pickup device; a recording control unit which records information based on the sound data as recording information corresponding to one of predetermined items; an item management unit which extracts one of the items, in which the recording information has not yet been recorded, as an uninput item; and a presentation control unit which causes a presentation device to show the uninput item.

According to an aspect of the invention, a recording system includes the above described control device; the sound pickup device; and the presentation device.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram schematically showing an example of a configuration of a recording system according to an embodiment;

FIG. 11 is a flowchart showing an example of an alarm process according to the embodiment;

FIG. 12 is a flowchart showing an example of an image recording process according to the embodiment;

FIG. 13 is a diagram showing an example of a picture displayed on the display device according to the embodiment and also showing a state in which an inspection target, a determination result, an inspection sound and an inspection target image are input;

DETAILED DESCRIPTION OF THE INVENTION

Figure 2:
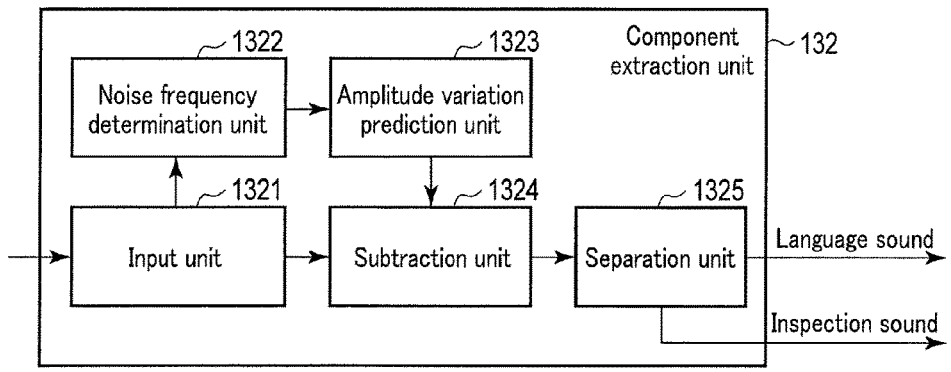
FIG. 2 is a block diagram schematically showing an example of a configuration of a component extraction unit according to the embodiment.

A recording system according to one embodiment of the present invention will be described with reference to the accompanying drawings. The recording system is, for example, a system for efficient recording for specific use. In this recording system, text information and sound information are extracted, organized and recorded with precision. Image information is also recorded when the need arises.

(System Configuration)

FIG. 1 schematically shows an example of a configuration of a recording system 10 according to the present embodiment. As shown in FIG. 1, the recording system 10 includes a control device 100, a sound pickup device 200, an image pickup device 300 and a display device 400. The control device 100 controls the whole operation of the recording system 10.

The sound pickup device 200 includes a microphone. The sound pickup device 200 converts a sound wave into an electrical signal to generate sound data. The sound pickup device 200 transmits the sound data to the control device 100. The generation of the sound data can be controlled by the control device 100. It is favorable that a user can freely use his or her both hands, or it is favorable that the user's hands may not become busy to operate the recording system 10. It is thus preferable that the microphone of the sound pickup device 200 be fixed to a user's body.

The image pickup device 300 includes an image pickup unit including an imaging optical system and an image sensor. The image pickup device 300 converts a subject image into an electrical signal to generate image data. The image pickup device 300 transmits the image data to the control device 100. The generation of the image data can be controlled by the control device 100. In the present embodiment, it is favorable that the user's both hands be free to the operation of the recording system 10 and thus it is preferable that the image pickup unit of the image pickup device 300 be fixed to the user's body.

The display device 400 includes a display element. The display device 400 displays an image under the control of the control device 100. In the present embodiment, it is favorable that the user's both hands be free to the operation of the recording system 10 and thus it is preferable that the display element of the display device 400 be fixed to the user's body. In other words, it is preferable that the display device 400 be a head mounted display (HMD) and the like.

The control device 100 includes a control circuit 110, a sound processing circuit 130, an image processing circuit 140, a storage device 160, a communication device 170 and an input device 180. The control circuit 110, sound processing circuit 130, image processing circuit 140, storage device 160, communication device 170 and input device 180 are connected to one another via a bus line 190.

The control circuit 110 controls the whole operation of the control device 100. The sound processing circuit 130 processes sound data generated by the sound pickup device 200. The sound processing circuit 130 includes a sound acquisition unit 131, a component extraction unit 132, a text generator 133 and an inspection sound extraction unit 134.

The sound acquisition unit 131 acquires sound data generated by the sound pickup device 200 and transmits the sound data to the component extraction unit 132.

The component extraction unit 132 extracts a language portion of the sound data which is significant as language and a significant sound portion which is a portion other than the language portion and is significant as sound. The frequency distribution of language sounds differs from that of noise. In other words, the frequency distribution of noise does not so vary with time but the amplitude thereof varies, whereas the frequency distribution of language sounds greatly varies with time in accordance with variations in words, syllables, expression of feeling, phrases and the like and the amplitude thereof does not so vary. As for a specific sound such as a hammering sound, the variations in frequency distribution and amplitude show a specific aspect. On the basis of these variations, the component extraction unit 132 first removes the noise and then separates the language sounds and the hammering sound.

An example of a configuration of the component extraction unit 132 will be described with reference to the block diagram shown in FIG. 2. As shown in FIG. 2, the component extraction unit 132 includes an input unit 1321, a noise frequency determination unit 1322, an amplitude variation prediction unit 1323, a subtraction unit 1324 and a separation unit 1325.

The input unit 1321 is a section to which sound data is input from the sound acquisition unit 131. The sound data input to the input unit 1321 is transmitted to the noise frequency determination unit 1322 and subtraction unit 1324. The noise frequency determination unit 1322 acquires the sound data and extracts a noise frequency distribution from the sound data. The noise frequency determination unit 1322 transmits the extracted noise frequency distribution to the amplitude variation prediction unit 1323. With respect to the noise frequency distribution, the amplitude variation prediction unit 1323 predicts a variation in amplitude on the basis of variations in past amplitudes. The amplitude variation prediction unit 1323 supplies the subtraction unit 1324 with the predicted variation in amplitude for the noise frequency distribution.

The subtraction unit 1324 subtracts a prediction value of noise, which is acquired from the amplitude variation prediction unit 1323, from the sound data acquired from the input unit 1321 to generate sound data from which noise is removed. The subtraction unit 1324 transmits the generated sound data to the separation unit 1325. The separation unit 1325 separates a language sound and an inspection sound on the basis of, e.g. the frequency distribution and amplitude variation of the sound data. The separation unit 1325 transmits sound data of the language sound to the text generator 133 and also transmits sound data of the inspection sound to the inspection sound extraction unit 134.

Returning to FIG. 1, the descriptions of the recording system 10 will be continued. The text generator 133 receives sound data of the language portion, or sound data of the language sound from the component extraction unit 132, and creates text information on the basis of the sound data using the voice recognition technology. The text generator 133 may create the text information using a voice recognition database (DB) 163 stored in the storage device 160. The voice recognition DB 163 includes, for example, information indicating a relationship between sound data and text information of a word used for inspection. The text generator 133 collates the acquired sound data with the voice recognition DB 163 to determine a word to be used for inspection. Whatever technology can be used for the voice recognition method using the text generator 133. The text generator 133 supplies the created text information to the control circuit 110.

The information recorded in the voice recognition DB 163 may vary among, for example, countries or regions. Furthermore, the information recorded in the voice recognition DB 163 may also vary among words to be recognized, which depend on a situation where the recording system 10 is used. The voice recognition DB 163 may include a voice with a word to be recognized is read out or a result of voice syntheses of the word.

The inspection sound extraction unit 134 receives sound data of the significant sound portion, or sound data including the inspection sound from the component extraction unit 132 and extracts a portion of the inspection sound from the sound data. The inspection sound extraction unit 134 supplies sound data of the extracted inspection sound to the control circuit 110.

The image processing circuit 140 processes image data generated by the image pickup device 300. The image processing circuit 140 includes an image acquisition unit 141 and an image processing unit 142. The image acquisition unit 141 acquires image data generated by the image pickup device 300 and transmits the image data to the image processing unit 142. The image processing unit 142 performs various image processes necessary for the image data acquired from the image acquisition unit 141. The image processing unit 142 supplies the processed image data to the control circuit 110.

The storage device 160 includes a semiconductor memory, a hard disk, an optical disk or the like. The storage device 160 stores information to be recorded by the recording system 10 and various items of information necessary for operating the control device 100. For example, when the recording system 10 is used for a certain type of inspection, the storage device 160 stores an inspection result file group 161. The inspection result file group 161 includes one or more inspection result files 600 including information of the inspection results. The storage device 160 may store various items of data to be recorded by the recording system 10 as well as the inspection results. The storage device 160 also stores control information 162 including programs used in the control circuit 110, various parameters and the like. The storage device 160 also stores the foregoing voice recognition DB 163. Furthermore, the storage device 160 stores an inspection term DB 164 in which inspection terms are listed. As will be described later, the inspection term DB 164 uses the text information created by the text generator 133 when an inspection target or an evaluation result representing a result of the inspection is recorded.

The communication device 170 carries out communications with the sound pickup device 200, image pickup device 300, display device 400 and the like under the control of the control circuit 110. The control device 100 acquires information from an external device via the communication device 170 and controls the operation of the external device. The control device 100 can be connected to a network such as the Internet via the communication device 170 to upload information to, e.g. a database on the network and download information from the database or the like. The communication device 170 may perform both wireless communications and wired communications. As the wireless communications, for example, Wi-Fi and Bluetooth can be used. When the communication device 170 receives or transmits a relatively large item of data such as image data from the image pickup device 300 or to the display device 400, it is desirable to use a relatively-high-speed communication method such as Wi-Fi. When the communication device 170 receives or transmits a relatively small item of data such as sound data from the sound pickup device 200, a relatively-low-speed communication method such as Bluetooth can be used.

The input device 180 includes a button switch, a keyboard, a touch panel or the like. The input device 180 receives a user's input. The information input to the input device 180 is processed by the control circuit 110.

The control circuit 110 includes a recording control unit 111, an item management unit 112, a communication control unit 113, a search control unit 114, a sound pickup control unit 116, an image pickup control unit 117 and a display control unit 118.

The recording control unit 111 controls recording the text information acquired from the text generator 133 of the sound processing circuit 130, the inspection sound information acquired from the inspection sound extraction unit 134, etc. appropriately in the storage device 160 as recording information. The files recorded at this time become the inspection result files 600. The destination of the recording is not limited to the storage device 160 in the control device 100. For example, various items of information can be recorded in an external storage device of the control device 100 through a network.

The item management unit 112 manages an item to be recorded in the inspection result files. For example, the item management unit 112 specifies an item that was recorded by the recording control unit 111 and an uninput item that has not yet been recorded. The item management unit 112 causes the display device 400 to display a list of items to be recorded and the current status of uninput items or the like through the display control unit 118.

The communication control unit 113 controls communications with an external device of the control device 100. The communications include communications with the sound pickup device 200, image pickup device 300, display device 400 and the like. The communications also include a connection with the Internet, for example.

The search control unit 114 controls a process of searching the inspection result files 600 included in the storage device 160 or an external database for a user's desired inspection result file 600.

The sound pickup control unit 116 controls the operation of the sound pickup device 200. For example, the sound pickup control unit 116 controls the start and end of generation of sound data by the sound pickup device 200. At this time, the sound pickup control unit 116 may cause the sound pickup device 200 to start and end creating sound data on the basis of the text information acquired from the text generator 133.

The image pickup control unit 117 controls the operation of the image pickup device 300. For example, the image pickup control unit 117 controls timing of image pickup of the image pickup device 300. At this time, the image pickup control unit 117 may cause the image pickup device 300 to obtain an image on the basis of the text information acquired from the text generator 133.

The display control unit 118 controls the operation of the display device 400. The display control unit 118 causes the display device 400 to display a list of items and a status of the recording system 10 under the control of the item management unit 112. The display control unit 118 also causes the display device 400 to display, e.g. a search result obtained by the search control unit 114.

The control circuit 110, sound processing circuit 130 and image processing circuit 140 include an integrated circuit such as a central processing unit (CPU), an application specific integrated circuit (ASIC) or a field programmable gate array (FPGA). The control circuit 110, sound processing circuit 130 and image processing circuit 140 each can be configured by a single integrated circuit, a combination of a plurality of integrated circuits, or the like. At least two of these circuits 110, 130 and 140 can be configured by a single integrated circuit or the like.

The operations of these circuits 110, 130 and 140 are performed in accordance with the programs included in the control information 162 recorded in the storage device 160, the programs recorded in a recording area in each of the circuits, and the like.

(Overview of Operation of Recording System)

An example of use of the recording system 10 according to the present embodiment will be described. In this example, the recording system 10 is used to record results of a hammering test for civil engineering structures. In the hammering test, the name of an inspection target, a hammering sound made when the inspection target is hit, a result of determination as to whether the hammering sound is a resonant sound or a non-resonant sound, and a picture of the inspection target are recorded in association with one file.

Figure 3:
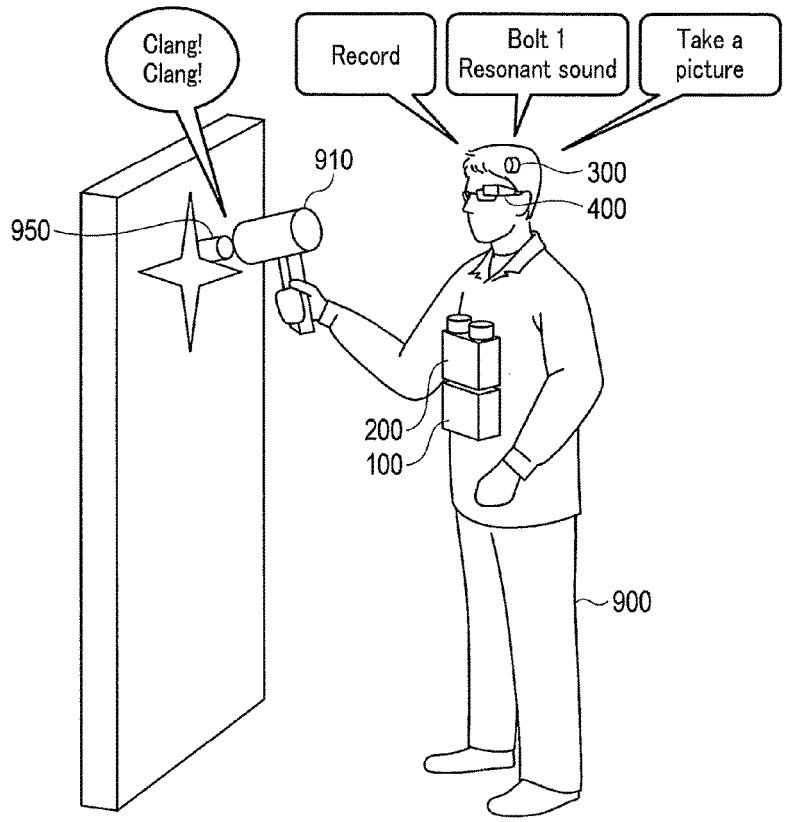
FIG. 3 is an illustration of an example of the configuration of the recording system according to the embodiment and an example of a status of use of the recording system.

FIG. 3 is a schematic view showing a scene in which a user 900 is conducting a hammering test. As shown in FIG. 3, the user 900 has the control device 100, sound pickup device 200, image pickup device 300 and display device 400 on his or her body. The user 900 can thus use his or her both hands freely.

At the start of recording, the user 900 says, for example, "record." This user's voice is acquired by the sound pickup device 200 and its content is specified by the control device 100, thus starting the recording. Then, the user 900 hits an inspection target 950 with a hammer 910, for example. The sound pickup device 200 acquires a sound made by the hammer, and the control device 100 identifies the sound as a hammering sound. The control device 100 records sound data of the hammering sound in the inspection result file 600. After that, the user 900 says an inspection target. For example, user 900 says "bolt 1" as the inspection target. This user's voice is acquired by the sound pickup device 200 and recognized by the control device 100. On the basis of the voice recognition result, text information of "bolt 1" is recorded in the inspection result file 600 as an inspection target item. Then, the user 900 determines whether the hammering sound is a resonant sound or a non-resonant sound, and says, for example, "resonant sound." This voice is acquired by the sound pickup device 200 and recognized by the control device 100. On the basis of the voice recognition result, text information of "resonant sound" is recorded in the inspection result file 600 as an evaluation result item. The user 900 also says, for example, "take a picture" to take a picture of the inspection target. This voice is acquired by the sound pickup device 200 and detected by the control device 100. The control device 100 causes the image pickup device 300 to obtain an image on the basis of a result of the detection. The control device 100 records image data so acquired in the inspection result file 600 as image information. The hammering test so described is ended.

Figure 4:
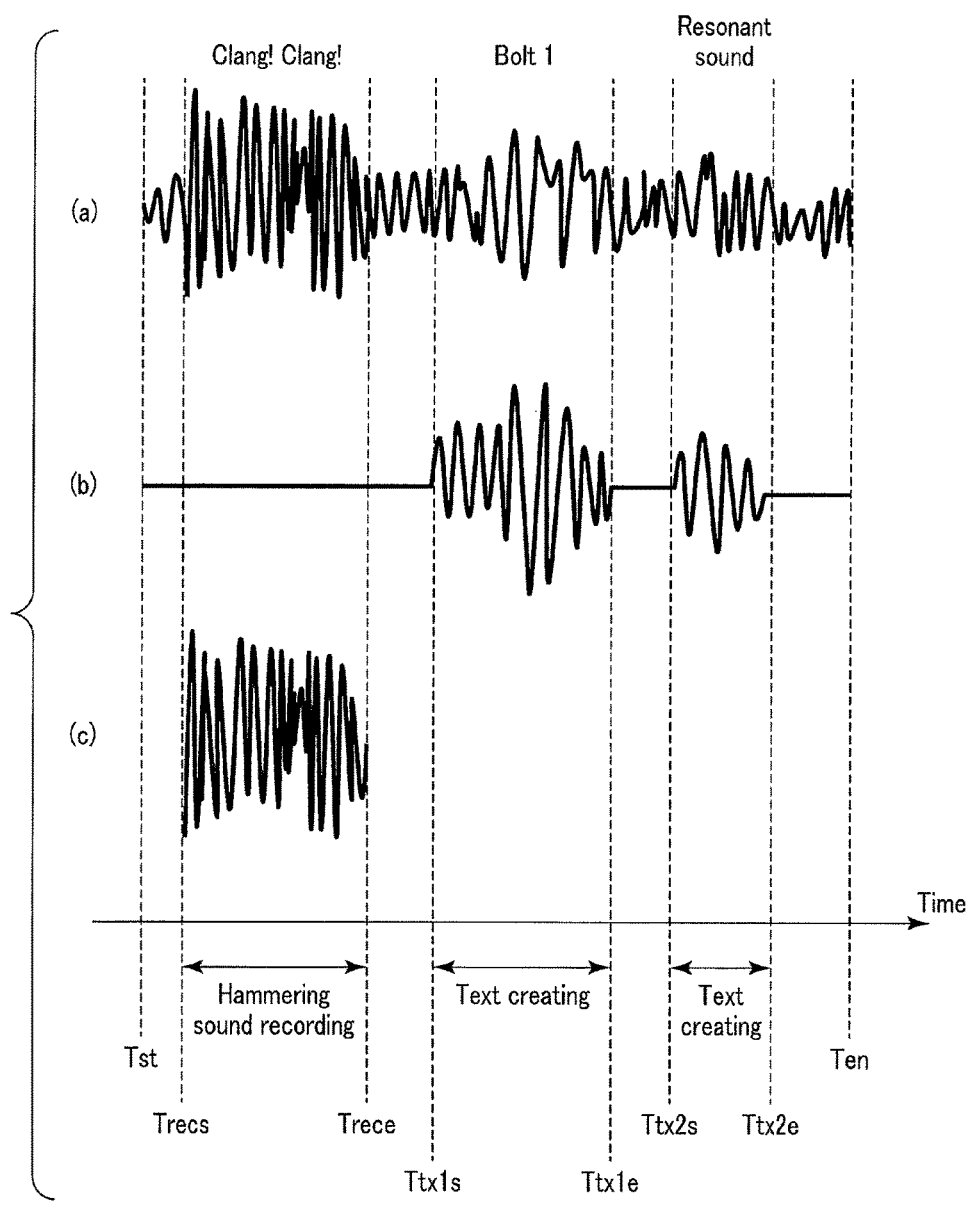
FIG. 4 is a chart schematically showing an example of sound data acquired in a hammering test and also snowing a process of the sound data.

The sound acquired in the hammering test will be described with reference to FIG. 4 that schematically shows the sound data. FIG. 4 is a chart showing the amplitudes of signals of sound data with respect to time represented by the horizontal axis. In FIG. 4, (a) shows the original sound data acquired by the sound pickup device 200. In the example of FIG. 4, a hammering sound of "clang! clang!" is made, then a user says, "bolt 1" as an inspection target and finally the user says, "resonant sound" as a determination result.

First, noise is removed from the original sound data shown in (a) of FIG. 4. In the noise-removed sound, the language sound and the inspection sound are separated from each other. In FIG. 4, (b) shows sound data of the separated language sound and (c) shows sound data of the separated inspection sound. In other words, as shown in FIG. 4, the hammering sound is included in a period from inspection sound start time Trecs to inspection sound end time Trece, which is included in a period from sound data start time Tst to sound data end time Ten. The voice with which the user says an inspection target is included in a period from first language start time Ttx1$s$ to first language end time Ttx1$e$. Furthermore, the voice with which the user says a determination result is included in a period from second language start time Ttx2$s$ to second language end time Ttx2$e$.

The voice recognition technology is applied to the present embodiment on the basis of data of the noise-removed language sound as shown in (b) of FIG. 4. Accordingly, text information is created on the basis of sound data in a period from the first language start time Ttx1$s$ to the first language end time Ttx1$e$. Similarly, text information is created on the basis of sound data in a period from the second language start time Ttx2$s$ to the second language end time Ttx2$e$. These items of text information are recorded in the inspection result file 600. Moreover, data of the noise-removed inspection sound as shown in (c) of FIG. 4 is recorded in the inspection result file 600 as a hammering sound.

An example where information items are recorded in the inspection result file in the following order: the inspection sound, inspection target, determination result and image, has been described; however, the embodiment is not limited to this example. For example, the image can be recorded anytime. If a user hits the inspection target after he or she says the inspection target, the hammering sound can be recorded after the inspection target is recorded. The information items can be recorded in another order.

(Structure of Inspection Result File)

An overview of an example of the structure of the inspection result file 600 will be described with reference to FIG. 5. The inspection result file 600 includes sound data 610, inspection target information 620, evaluation result information 630, inspection sound information 640, image information 650 and inspection information 660.

The sound data 610 is data of sound obtained by the sound pickup device 200. The sound data 610 is data from the start time Tst to the end time Ten shown in, e.g. FIG. 4. In other words, the sound data 610 includes a language sound made when a user says both an inspection target and an evaluation result, an inspection sound, and the like.

The inspection target information 620 includes text information (voice recognition) 621, text information (the other inputs) 622 and sound data effective section information 623. The text information (voice recognition) 621 includes text information acquired by voice recognition on the basis of the sound data 610. In the example of FIG. 4, therefore, the text information (voice recognition) 621 includes text information of "bolt 1" created based on the sound data from the first language start time Ttx1$s$ to the first language end time Ttx1$e$. The text information (the other inputs) 622 includes text information input by a method other than the voice recognition. The input method other than the voice recognition includes input methods using a keyboard, a touch panel and the like. The sound data effective section information 623 includes information indicating a section used to acquire the text information (voice recognition) 621, which is included in the sound data 610. In the example of FIG. 4, the sound data effective section information 623 includes information indicating that the start is the first language start time Ttx1$s$ and the end is the first language end time Ttx1$e$.

The text information (the other inputs) 622 can be configured such that it is included in the inspection target information 620 only when text information is input from, e.g. a keyboard without appropriate voice recognition. When text information is input from, e.g. a keyboard, the text information (voice recognition) 621 need not be included therein. Furthermore, the text information (voice recognition) 621 and the text information (the other inputs) 622 are not separated from each other but can be included in the inspection target information 620 as one text information item, and information indicating whether the one text information item is created by voice recognition or by the other inputs can be only added to the text information item.

The evaluation result information 630 includes text information (voice recognition) 631, text information (the other inputs) 632 and sound data effective section information 633. The text information (voice recognition) 631 includes text information acquired by voice recognition on the basis of the sound data 610. In the example of FIG. 4, therefore, the text information (voice recognition) 631 includes text information of "resonant sound" created based on the sound data from the second language start time Ttx2s to the second language end time Ttx2e. The text information (the other inputs) 632 includes text information input by a method other than the voice recognition. The input method other than the voice recognition includes input methods using a keyboard, a touch panel and the like. The sound data effective section information 633 includes information indicating a section used to acquire the text information (voice recognition) 631, which is included in the sound data 610. In the example of FIG. 4, the sound data effective section information 633 includes information indicating that the start is the second language start time Ttx2s and the end is the second language end time Ttx2e.

The text information (the other inputs) 632 can be configured such that it is included in the evaluation result information 630 only when text information is input from, e.g. a keyboard without appropriate voice recognition. When text information is input from, e.g. a keyboard, the text information (voice recognition) 631 need not be included therein. Furthermore, the text information (voice recognition) 631 and the text information (the other inputs) 632 are not separated from each other but can be included in the evaluation result information 630 as one text information item, and information indicating whether the one text information item is created by voice recognition or by the other inputs can be only added to the text information item.

The inspection sound information 640 includes sound data effective section information 642. The sound data effective section information 642 includes information indicating a section including an inspection sound, which is included in the sound data 610. In the example of FIG. 4, the sound data effective section information 642 includes information indicating that the start is the inspection sound start time Trecs and the end is the inspection sound end time Trece. The inspection sound information 640 may include sound data 641 corresponding to a period from the inspection sound start time Trecs to the inspection sound end time Trece, which is included in the sound data 610.

The image information 650 includes image data 651 and picture-taking time and date information 652. The image data 651 is captured by the image pickup device 300 and includes data processed by the image processing unit 142. In the example of FIG. 3, the image data 651 is data indicating a picture of a bolt to be inspected. The picture-taking time and date information 652 includes information indicative of the time and date on which an image is obtained by the image pickup device 300. The image information 650 may include information about the image data 651 in addition to the picture-taking time and date information 652. For example, the image information 650 may include information of the image pickup device 300 used to obtain the image and information of picture-taking conditions and the like. Furthermore, the picture-taking time and date information 652 can be omitted.

The inspection information 660 is an arbitrary item of information. The inspection information 660 includes inspector information 661, inspection time and date information 662, inspection place information 663 and the like. The inspector information 661 includes information about an inspector who conducted inspection to be recorded in the inspection result file 600. The inspection time and date information 662 is information indicating the time and date on which the inspection was conducted, and the inspection place information 663 is information indicating an area where the inspection was conducted.

As described above, the recording control unit 111 controls managing the sound data 610, inspection target information 620, evaluation result information 630, inspection sound information 640, image information 650, inspection information 660 and the like as items to be recorded, and then recording these items as recording information. The items are therefore recorded in association with one another.

Environmental sound information could be recorded in terms of a report depending on the environment. In the use described above, an environmental sound and information (sound pressure and rhythm, frequency, results of scene determination by sound, etc.) obtained therefrom can be recorded separately in different areas. This information can be effective, for example, to search for a sound made under the same environment.

The structure of the inspection result file 600 described so far is one example. The inspection result file is not limited to the structure but may have different structures. The inspection result file 600 may include only some of the sound data 610, inspection target information 620, evaluation result information 630, inspection sound information 640, image information 650 and inspection information 660 or include the other information. In this embodiment, the term "inspection result file" is used; however, the present invention is not limited to a special file. The "voice file" chiefly including voices and the "image file" chiefly including images can be expanded to a file having the structure as described above. It is thus emphasized here that the present invention can be applied to a technology of a voice file having an inspection result as tag information, a technology of an image file associated with an inspection result, and their related technologies.

(Operation of Recording System)

Figure 6:
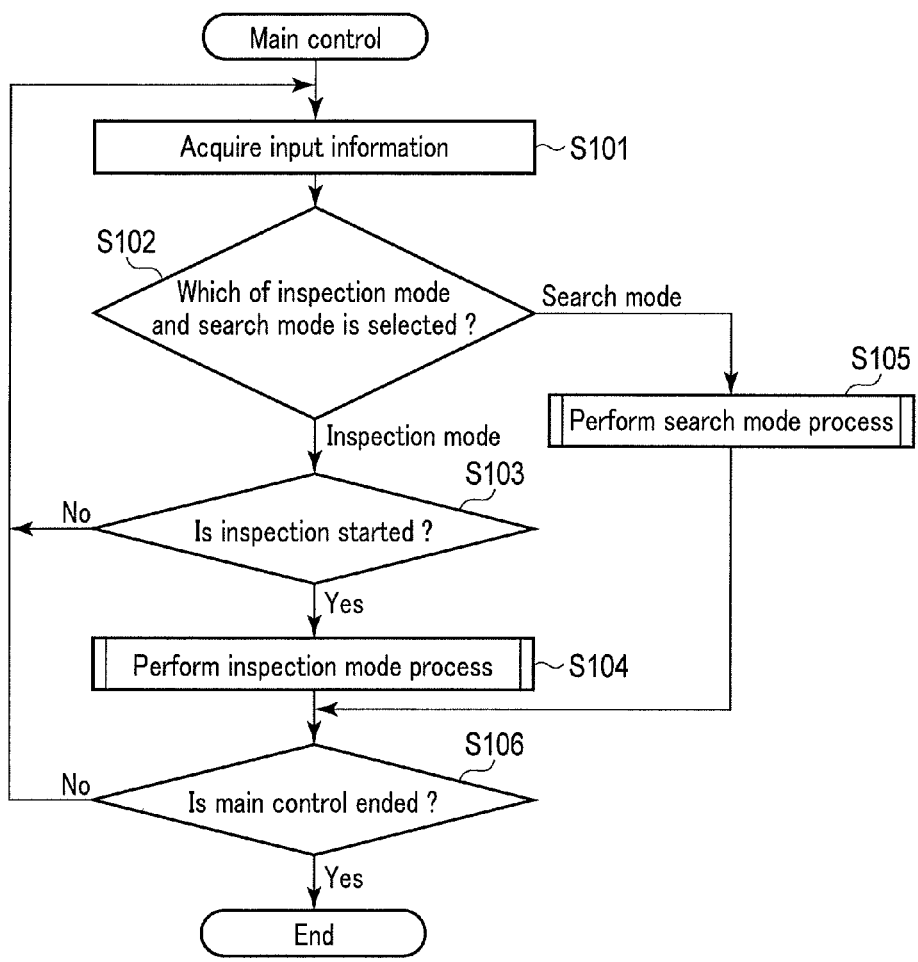
FIG. 6 is a flowchart showing an example of a main control process according to the embodiment.

An operation of the recording system 10 according to the present embodiment will be described with reference to the drawings. The main control according to the present embodiment will be described with reference to the flowchart shown in FIG. 6.

In step S101, the control device 100 acquires information that is input to the recording system 10. This information includes information indicating which of an inspection mode and a search mode, which will be described later, is selected, an instruction to start an inspection, and the like. The information can be input by a switch, a touch panel or the like. In other words, the control circuit 110 may acquire information input using, e.g. the input device 180. The information can also be input by recognizing a voice that a user gives. In other words, the control circuit 110 may acquire information which is obtained by, e.g. the sound pickup device 200 and recognized by the sound processing circuit 130.

In step S102, the control circuit 110 of the control device 100 determines whether the currently selected mode is an inspection mode or a search mode. When it is an inspection mode, the process moves to step S103. In step S103, the control circuit 110 determines whether to start an inspection.

When the user starts no inspection, the process returns to step S101. When the user starts an inspection, the process moves to step S104.

In step S104, the control device 100 performs an inspection mode process. The inspection mode process is a process of recording a hammering sound, an inspection target and an evaluation result that the user says, etc. and then creating an inspection result file 600 in which an inspection result is recorded based upon the recorded items. In the inspection mode process, an image can be obtained and recorded in the inspection result file 600. The inspection mode process will be described in detail later. After the inspection mode process, the process moves to step S106.

In step S102, when the control circuit 110 determines that the currently selected mode is a search mode, the process moves to step S105. In step S105, the control device 100 performs a search mode process. The search mode process is a process of selecting user's interesting data from among the inspection results obtained in the inspection mode process. The search mode process will be described in detail later. After the search mode process, the process moves to step S106.

In step S106, the control circuit 110 determines whether to end the main control. When the main control is not ended, the process returns to step S101. When the main control is ended, the process is ended.

Figure 7:
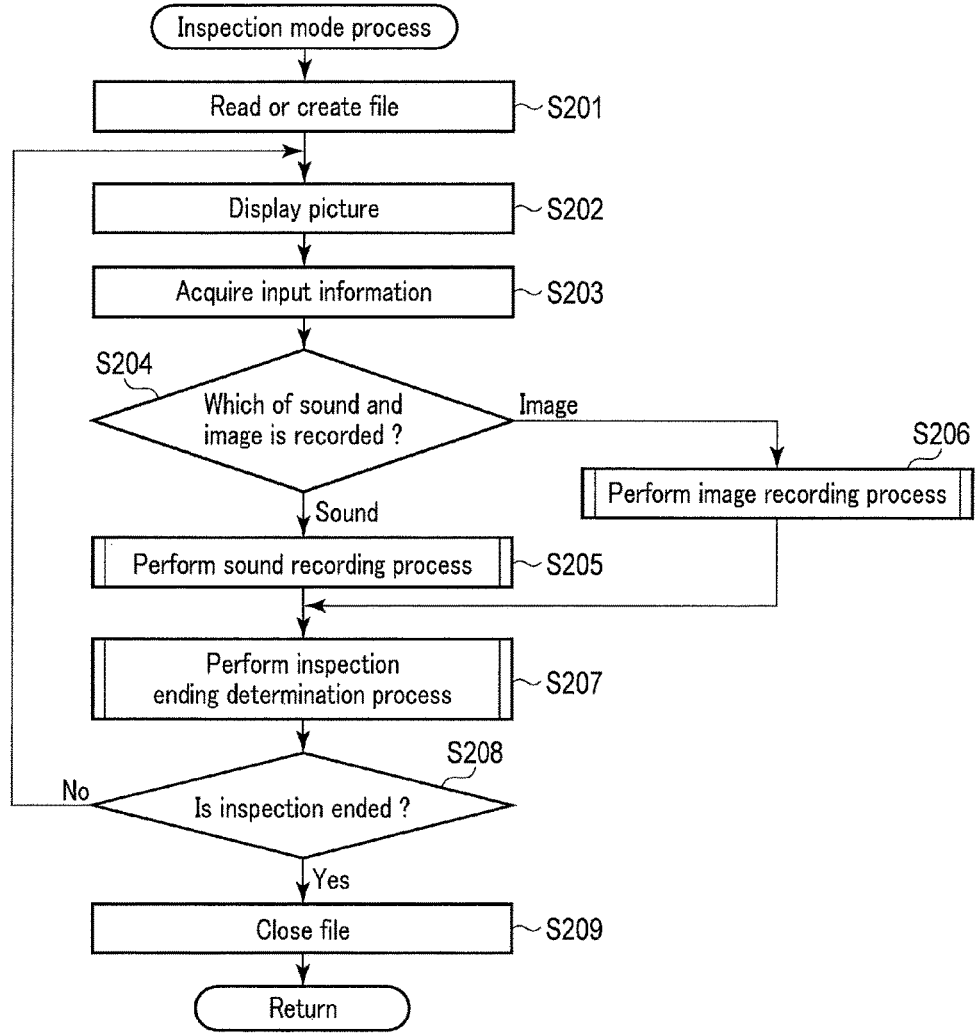
FIG. 7 is a flowchart showing an example of an inspection mode process according to the embodiment.

The inspection mode process to be performed in step S104 will be described with reference to the flowchart shown in FIG. 7.

In step S201, the control device 100 reads or creates an inspection result file 600 in which inspection results are recorded. More specifically, when additional information is recorded in the inspection result file 600 that has existed in the inspection result file group 161 recorded in the storage device 160, the recording control unit 111 of the control circuit 110 reads the inspection result file 600 out of the storage device 160. Furthermore, the recording control unit 111 newly creates an inspection result file 600 when the inspection result file group 161 has no inspection result file to record information.

Figure 8:
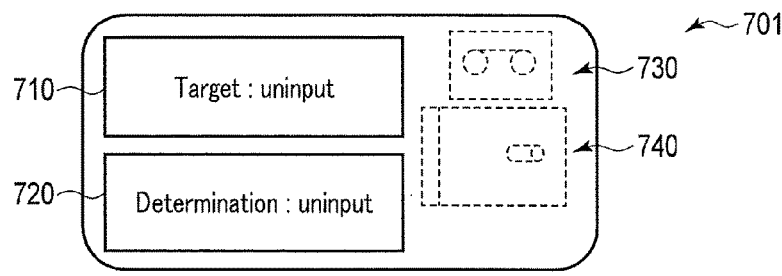
FIG. 8 is a diagram showing an example of a picture displayed on a display device according to the embodiment and also showing a case where no inspection item is input.

In step S202, the control device 100 causes the display device 400 to display a picture for the inspection mode. In other words, the display control unit 118 of the control circuit 110 controls the display operation of the display device 400. FIG. 8 shows an example of the initial display for the inspection mode. As shown in FIG. 8, a picture 701 displayed on the display device 400 includes, for example, items to be recorded in the inspection result file. The items include an inspection target, a determination result, a hammering sound, an inspection target image and the like. The picture displayed on the display device 400 includes, for example, a section 710 showing an inspection target, a section 720 showing a determination result, a section 730 showing the presence or absence of recording of a hammering sound, and a section 740 showing the presence or absence of image pickup of the inspection target. In the picture 701 shown in FIG. 8, an inspection target, a determination result, a hammering sound or an inspection target image is not input.

In step S203, the control device 100 acquires information input to the recording system 10. This information includes, for example, information indicating whether information to be recorded is sound data or image data. These information items can be input using, e.g. a switch and a touch panel or by recognizing a voice that a user gives.

In step S204, the control circuit 110 of the control device 100 determines whether information to be recorded is sound data such as a voice or image data. For example, when the sound pickup device 200 detects a significant voice, the control circuit 110 determines that information to be recorded is sound data. In the example shown in FIG. 3, when a user says "record," the control circuit 110 determines that information to be recorded is sound data. When an operation to start recording a voice is input to the input device 180 of the control device 100, the control circuit 110 also determines that information to be recorded is sound data. For example, when an operation to obtain an image by the image pickup device 300 is performed, the control circuit 110 determines that information to be recorded is image data. In the example shown in FIG. 3, when a user says "take a picture," the control circuit 110 also determines that information to be recorded is image data. When information to be recorded is sound data, the process moves to step S205.

In step S205, the control device 100 performs a sound recording process. In the sound recording process, on the basis of sound data generated by the sound pickup device 200, necessary information is extracted and recorded in the inspection result file 600 opened in step S201. The sound recording process will be described in detail later. After the sound recording process, the process moves to step S207.

In step S204, when the control circuit 110 determines that information to be recorded is an image, the process moves to step S206. In step S206, the control device 100 performs an image recording process. In the image recording process, necessary image information based upon image data generated by the image pickup device 300 is recorded in the inspection result file 600 opened in step S201. The image recording process will be described in detail later. After the image recording process, the process moves to step S207.

In step S207, the control device 100 performs an inspection ending determination process. The inspection ending determination process is a process of determining whether information is input for all of the prescribed inspection items and then determining whether to end the inspection. In the inspection ending determination process, a user is prompted to input information to necessary items, and a process of inputting information using a device other than the sound pickup device 200 and image pickup device 300 is performed. The inspection ending determination process will be described in detail later. After the inspection ending determination process, the process moves to step S208.

In step S208, the control circuit 110 of the control device 100 determines whether the inspection is ended on the basis of a result of the inspection ending determination process. When the inspection is not ended, the process returns to step S202. When the inspection is ended, the process moves to step S209. In step S209, the recording control unit 111 of the control circuit 110 closes the currently opened inspection result file 600. Accordingly, the inspection mode is ended, and the process returns to the main control.

Figure 9:
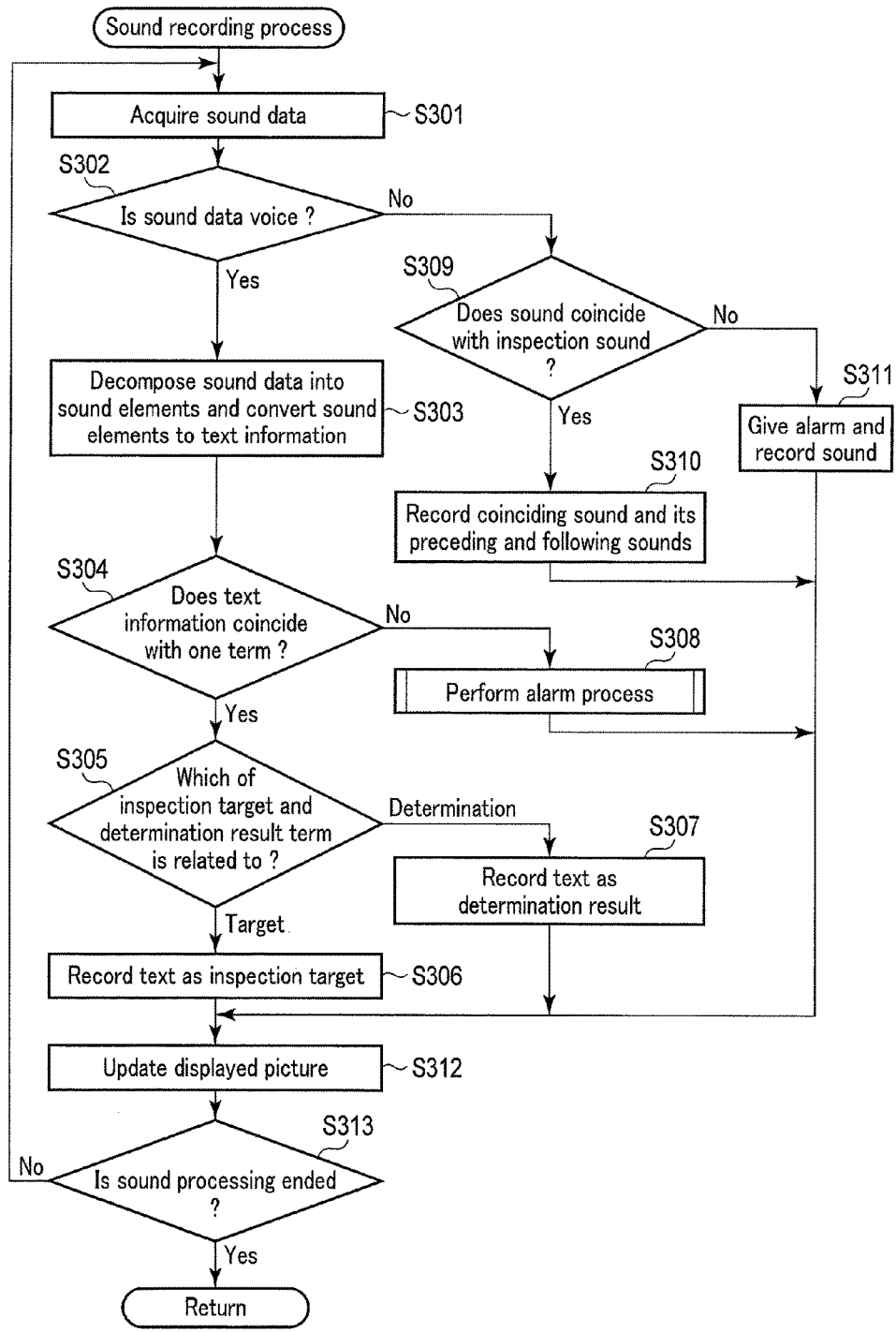
FIG. 9 is a flowchart showing an example of sound recording process according to the embodiment.

The sound recording process to be performed in step S205 will be described with reference to FIG. 9.

In step S301, the sound processing circuit 130 of the control device 100 acquires sound data from the sound pickup device 200. In step S302, the component extraction unit 132 of the sound processing circuit 130 determines whether the currently acquired sound data is data about voice. When the sound data is data about voice, the process moves to step S303.

In step S303, the text generator 133 of the sound processing circuit 130 decomposes the acquired sound data into sound elements and converts the sound elements to text information.

In step S304, the control circuit 110 of the control device 100 determines whether the text information obtained in step S303 coincides with one of the terms used for the inspection, which are recorded in the inspection term DB 164. When they coincide with each other, the process moves to step S305.

In step S305, the control circuit 110 determines whether the term that coincides with the text information is related to an inspection target or a determination result. When it is related to an inspection target, the process moves to step S306. In step S306, the recording control unit 111 of the control circuit 110 records the text information obtained in step S303 in the inspection result file 600 as text information (voice recognition) 621 that indicates an inspection target. After that, the process moves to step S312.

When it is determined in step S305 that the term is related to a determination result, the process moves to step S307. In step S307, the recording control unit 111 of the control circuit 110 records the text information obtained in step S303 in the inspection result file 600 as text information (voice recognition) 631 that indicates a determination result. After that, the process moves to step S312.

When it is determined in step S304 that the text information does not coincide with one of the terms included in the inspection term DB, the process moves to step S308. In step S308, the control device 100 performs an alarm process. The alarm process includes a process of giving an alarm indicating that the text information does not coincide with an inspection term, a process of prompting a user to input information by a method other than a voice, and the like. The alarm process will be described in detail later. After the alarm process, the process moves to step S312.

When it is determined in step S302 that the sound data is not data about voice, the process moves to step S309. In step S309, the inspection sound extraction unit 134 of the sound processing circuit 130 determines whether the characteristic of the sound coincides with that of the inspection sound. When they coincide with each other, the process moves to step S310.

As a background of step S309, for example, there is a way of thinking of getting a language portion of the sound data as a clue and determining the meaning of the other portion thereof. As the clue, a simple way of thinking of determining the next sound as an inspection sound (significant sound) on the basis of information obtained from the language can be applied. It is natural that a method of performing necessary filtering for the inspection sound in accordance with the language or selecting a microphone and determining a direction of voice to be acquired could be devised. For example, after language about birds, a sound having a birdsong pattern and frequency and a sound from the start to end of birdsongs can be obtained and recorded in priority to the sound of wind. It is natural that the needs to pick up the sound of wind as an environmental sound could be handled.

In step S310, the control device 100 records information related to data of a sound whose characteristic coincides with that of the inspection sound and data of its preceding and following sounds in the inspection result file 600 as inspection sound information 640. More specifically, the inspection sound extraction unit 134 extracts information related to data of a sound whose characteristic coincides with that of the inspection sound and data of its preceding and following sounds, and transmits the extracted information to the control circuit 110. The recording control unit 111 of the control circuit 110 records the information in the storage device 160 as inspection sound information 640. After that, the process moves to step S312.

In step S309, when the characteristic of the sound does not coincide with that of the inspection sound, the process moves to step S311. In step S311, the control device 100 gives an alarm indicating that they do not coincide with each other and records the sound data in the inspection result file. In other words, the display control unit 118 of the control circuit 110 causes the display device 400 to display that the characteristic of the sound does not coincide with that of the inspection sound, or the control device 100 may notify a user that the characteristic of the sound does not coincide with that of the inspection sound because of the sound itself, the sound vibration or the like. At this time, the inspection sound extraction unit 134 of the sound processing circuit 130 transmits data of all the sounds except the acquired voice to the control circuit 110. The recording control unit 111 of the control circuit 110 records the data in the storage device 160 as inspection sound information 640. After that, the process moves to step S312.

Figure 10:
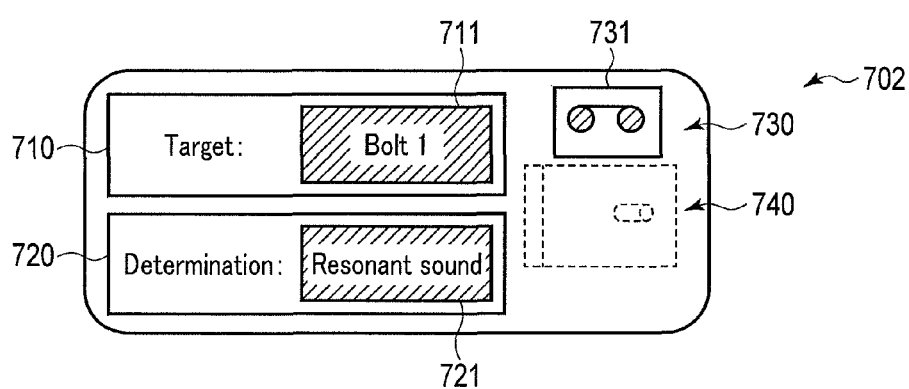
FIG. 10 is a diagram showing an example of a picture displayed on the display device according to the embodiment and also showing a state in which an inspection target, a determination result and an inspection sound are input.

In step S312, the control circuit 110 of the control device 100 updates the picture displayed on the display device 400. For example, when an inspection target, a determination result and an inspection sound are recorded, the display device 400 displays a picture showing the input contents or input facts. For example, a picture 702 as shown in FIG. 10 is displayed. More specifically, when text information of "bolt 1" is recorded in an inspection target item, text 711 of "bolt 1" is displayed in the section 710 showing an inspection target. When text information of "resonant sound" is recorded in a determination result item, text 721 of "resonant sound" is displayed in the section 720 showing a determination result. When sound data of a hammering sound is recorded, an icon 731 indicating that the hammering sound has been recorded is displayed in the section 730 showing the presence or absence of recording of a hammering sound. As has been described, whenever information is recorded in the inspection result file, the picture 702 displayed on the display device 400 includes text 711 such as "bolt 1," text 721 such as "resonant sound," icon 731 indicating that a hammering sound has been recorded, and the like. The picture displayed on the display device 400 allows a user to know which of the items information is recorded in. Further, the displayed text allows the user to know what text information is recorded in which item. This display allows the user to confirm whether the content that the user says coincides with the recorded content.

After the updating of the picture displayed in step S312, the process moves to step S313. In step S313, the control circuit 110 of the control device 100 determines whether the process of the sound data acquired in step S301 is ended or not. When it is not ended, the process returns to step S301. When it is ended, the sound recording process is ended, and the process returns to the inspection mode process which has been described with reference to FIG. 7.

For example, people utter words by changing their voices in sequence in a direction along the time axis from the past to the present. In communications, the meaning of the words can be understood by listing to the voices in sequence. The sound recording process described here is simplified to discriminate and analyze sounds with respective timings in sequence from the past in accordance with the characteristics of voices that vary with time. However, the present invention is not limited to this process. The sounds generated and obtained concurrently can be discriminated and analyzed according to the direction information of the sources of the voices, such as stereo sound, or by filtering the voices according to the frequency of the voices, or by both of them. The sound recording process also has an aspect of getting a language portion (which can be represented as a portion to be converted to text) of a sound as a clue and determining the meaning of the other portion of the sound. Therefore, a recording system including a sound acquisition unit that acquires sound data, a component extraction unit that extracts a language portion of the sound data which is significant as language and a significant sound portion which is obtained by analyzing a portion other than the language portion by priority, and a recording control unit that records the significant sound portion, and the inventions of a control device, technologies and the like related to the recording system can be extracted. The significant sound portion may be a component or a noise-removed portion. For example, this technology can be used to separate a chirp of a cricket from the environmental sound or background sound after a human voice of "cricket" and extract and record it. The language portion to be converted to text information can be used for the technology of giving an instruction to a device using a voice, and makes it possible to easily set the conditions for device control selection and voice processing using the search technology. This text information makes it possible to acquire and analyze abstract information such as an image as well as a voice meaningfully on the priority basis. In other words, there can be provided a control device for a system including a classification control unit that classifies information based on image data as information corresponding to one of the predetermined items according to the text information obtained from voice information. The language portion can also be used to separate an emphasized image of, e.g. a cricket from the background and display it after a human voice of "cricket." If a specific item for text creating is provided in advance and an item management unit for extracting items to which no information has been input as uninput items is provided, the reliability of text creating is increased. As for the example of "cricket," an erroneous determination can be prevented if a category of, e.g. "nature observation" is set.

An alarm process to be performed in step S308 will be described below with reference to the flowchart shown in FIG. 11.

In step S401, the control circuit 110 of the control device 100 determines whether the text information acquired in step S303 coincides with a plurality of inspection terms. If not, the process moves to step S402.

In step S402, the control circuit 110 determines whether the language sound created in step S303 is shorter than a predetermined length. If the language sound is shorter, the process moves to step S403. In step S403, the display control unit 118 of the control circuit 110 causes the display device 400 to display a message to prompt a user to speak slowly, such as saying "please speak slowly." After that, the alarm process is ended, and the process returns to the sound recording process which has been described with reference to FIG. 9.

In step S402, when the control circuit 110 determines that the language sound is not shorter, the process moves to step S404. In step S404, the control circuit 110 searches for a term, which corresponds to the text information acquired in step S303, from a dictionary other than the inspection term DB 164. This dictionary can be stored in the storage device 160 or an external device of the control device 100. Information stored in the external device is received or transmitted through the communication device 170, for example.

In step S405, the control circuit 110 determines whether there is a term coinciding with the text information in the search in step S404. If there is a coinciding term, the process moves to step S409. If there is no coinciding term to the contrary, the process moves to step S406. In step S406, the display control unit 118 of the control circuit 110 causes the display device 400 to display error information indicating that no appropriate term was found by voice recognition. After that, the alarm process is ended, and the process returns to the sound recording process.

In step S401, when the control circuit 110 determines that the text information coincides with a plurality of inspection terms, the process moves to step S407. In step S407, the control circuit 110 causes the display device 400 to display a list of inspection terms that has coincided with the text information as candidates. In step S408, the control circuit 110 determines whether is selected from the candidates in the list of inspection terms. If none of the candidates is selected, the process returns to step S408 and, in other words, the process waits until one of the terms is selected. On the other hand, when one of the terms is selected, the process moves to step S409.

In step S409, the control circuit 110 determines whether the selected term is related to an inspection target or a determination result. When the term is related to an inspection target, the process moves to step S410. In step S410, the recording control unit 111 of the control circuit 110 records text information selected for the inspection target in the inspection result file 600. After that, the process returns to the sound recording process.

In step S409, when the control circuit 110 determines that the term is related to a determination result, the process moves to step S411. In step S411, the recording control unit 111 of the control circuit 110 records the text information selected for the determination result in the inspection result file 600. After that, the process returns to the sound recording process.

An image recording process to be performed in step S206 of the inspection mode process will be described below with reference to the flowchart shown in FIG. 12.

In step S501, the control device 100 acquires image data obtained by the image pickup device 300. More specifically, the communication control unit 113 of the control circuit 110 communicates with the image pickup device 300 through the communication device 170. The control circuit 110 causes the image pickup device 300 to output image data. The image data output from the image pickup device 300 is acquired by the image acquisition unit 141 of the image processing circuit 140 through the communication device 170. In step S502, the control circuit 110 determines whether the image acquisition unit 141 succeeds in acquiring image data. When it succeeds, the process moves to step S503.

In step S503, the control device 100 records the acquired image in the inspection result file 600. More specifically, the image acquisition unit 141 transmits the acquired image data to the image processing unit 142. The image processing unit 142 processes the acquired image data and then transmits the processed image data to the control circuit 110. The recording control unit 111 of the control circuit 110 records the acquired image in the inspection result file 600.

In step S504, the control circuit 110 updates a picture to be displayed on the display device 400. For example, a picture 703 as shown in FIG. 13 is displayed. More specifically, when image data is recorded in the inspection result file 600, an icon 741 indicating that an inspection target image has been recorded is displayed in the section 740 showing the presence or absence of image pickup of the image. In the example of FIG. 13, an inspection target, a determination result and an inspection sound have been recorded in the inspection result file.

After the process of step S504, the image recording process is ended, and the process returns to the inspection mode process that has been described with reference to FIG. 7.

In step S502, when the control circuit 110 determines that the image acquisition unit 141 does not succeed in acquiring image data, the process moves to step S505. In step S505, the control device 100 gives an alarm indicating that the image acquisition unit 141 fails in acquiring image data. That is, the display control unit 118 of the control circuit 110 causes the display device 400 to display the alarm indicating the failure of the acquisition of the image data. The alarm can be given by sound or vibration as well as display on the display device 400. After that, the image recording process is ended, and the process returns to the inspection mode process.

Figure 14:
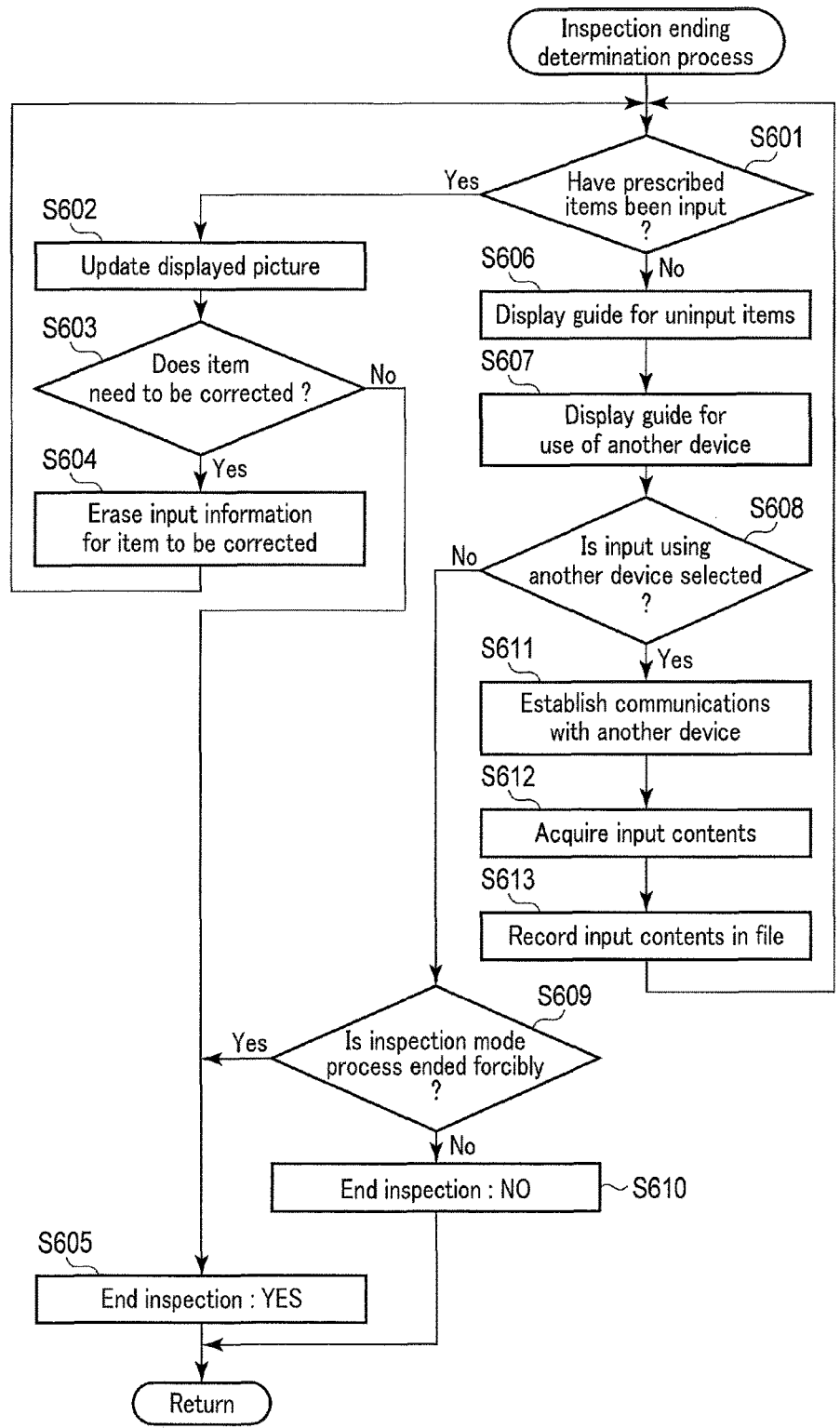
FIG. 14 is a flowchart showing an example of an inspection ending determination process according to the embodiment.

An inspection ending determination process to be performed in step S207 of the inspection mode process will be described below with reference to the flowchart shown in FIG. 14.

In step S601, the item management unit 112 of the control circuit 110 determines whether all of the prescribed items have been input to the opened inspection result file 600. When they have been input, the process moves to step S602.

Figure 15:
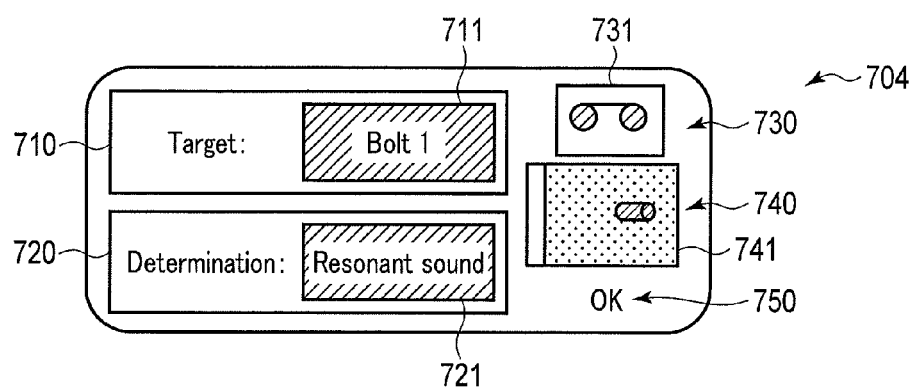
FIG. 15 is a diagram showing an example of a picture displayed on the display device according to the embodiment and also showing a state in which all of the items are input.

In step S602, the display control unit 118 of the control circuit 110 updates a picture to be displayed on the display device 400. For example, a picture 704 as shown in FIG. 15 is displayed. More specifically, all of the items are recorded in the inspection result file; thus, like the picture 703 shown in FIG. 13, the picture 704 includes display indicating that an inspection target, a determination result, an inspection sound and an image have been recorded. As shown in FIG. 15, furthermore, the picture 704 includes display 750 of "OK" indicating that all of the items have been input.

In step S603, the control circuit 110 determines whether an item needs to be corrected. For example, the display control unit 118 causes the display device 400 to display a message to ask a user whether an item needs to be corrected. Then, the control circuit 110 acquires information input based upon the voice obtained by the sound pickup device 200 and determines whether an item needs to be corrected based upon the information. If an item needs to be corrected, the process moves to step S604.

In step S604, the recording control unit 111 of the control circuit 110 erases the input information for the item to be corrected. After that, the process returns to step S601 and, in this case, at least one item of input information is erased; thus, it is determined in step S601 that all of the items have not been input.

In step S603, when the control circuit 110 determines that no item needs to be corrected, the process moves to step S605. In step S605, the control circuit 110 determines that the inspection is ended. After that, the inspection ending determination process is ended, and the process returns to the inspection mode process that has been described with reference to FIG. 7.

In step S601, when the item management unit 112 of the control circuit 110 determines that the prescribed items are not input, the process moves to step S606. In step S606, the control circuit 110 causes the display device 400 to display a guide showing an uninput item. For example, the item management unit 112 of the control circuit 110 extracts items which are not recorded in the inspection result file, in the section 710 showing an inspection target, the section 720 showing a determination result, the section 730 showing presence or absence of recording of a hammering sound and the section 740 showing the presence or absence of image pickup of the inspection target. The display control unit 118 causes the display device 400 to display a message of uninput as shown in FIG. 8 with respect to the uninput items extracted by the item management unit 112. The picture 701 shown in FIG. 8 is an example and can be displayed to emphasize the uninput items.

In step S607, the control circuit 110 causes the display device 400 to display a guide to suggest inputting text to the uninput items using another device. For example, it is guided to input text to the uninput items using a keyboard or a touch panel.

In step S608, the control circuit 110 determines whether a user selects input using another device. When input using another device is not selected, the process moves to step S609. In step S609, the control circuit 110 inquires of the user whether to end the inspection mode process forcibly. In other words, for example, the display control unit 118 of the control circuit 110 causes the display device 400 to display a message to ask whether the inspection mode process is ended forcibly. Furthermore, for example, the control circuit 110 acquires the content input by voice and the content input to the input device 180. When the inspection mode process is ended forcibly, the process moves to step S605. On the other hand, when it is not ended forcibly, the process moves to step S610. In step S610, the control circuit 110 determines that the inspection mode process is not ended. After that, the inspection ending determination process is ended, and the process returns to the inspection mode process that has been described with reference to FIG. 7.

In step S608, when the control circuit 110 determines that input by another device is selected, the process moves to step S611. In step S611, the control circuit 110 establishes communications with the device selected for input. In step S612, the control circuit 110 prompts a user to input an item using another device by a message displayed on the display device 400 and acquires the contents of the input item. In step S613, the recording control unit 111 of the control circuit 110 records the contents of the input item in a file. After that, the process returns to step S601. In addition, an item can be input using, e.g. the input device 180 of the control device 100 as well as another device.

A search mode process to be performed in step S105 of the main control will be described below. The search mode process is a process of presenting a user with information included in an inspection result file of the inspection result files 600 included in the inspection result file group 161 of the storage device 160, in which the user is interested. An inspection result file 600 in which a user is interested can be selected from among, for example, the inspection result files included in a database connected via the Internet as well as the inspection result files 600 recorded in the storage device 160.

Figure 16:
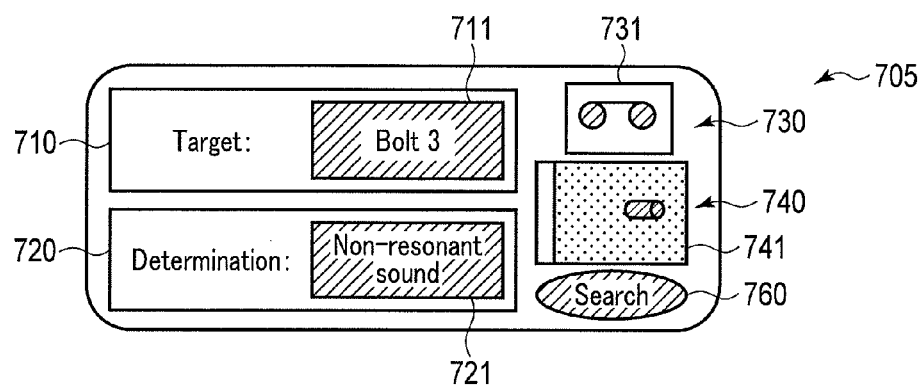
FIG. 16 is a diagram showing an example of a picture displayed on the display device according to the embodiment and also showing an example of display in the search mode.

For example, when a user desires information of the inspection result that the inspection target is bolt 3, the user says "bolt 3." At this time, an inspection result file showing that the inspection target is bolt 3 is read out of the inspection result file group 161. Then, the display device 400 displays a picture 705 as shown in FIG. 16, for example. As shown in FIG. 16, the picture 705 includes a display 760 showing the search mode.

Figure 17:
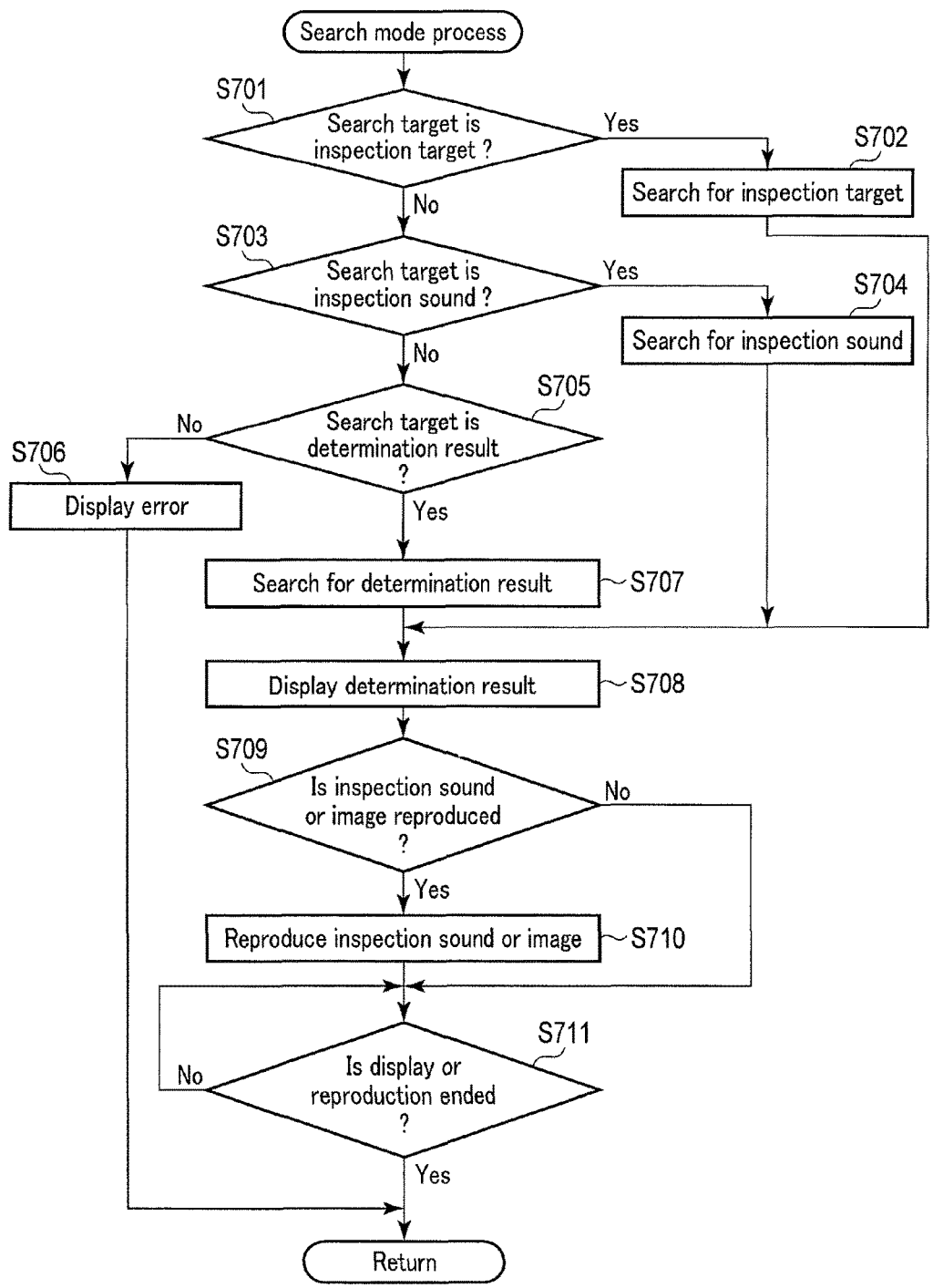
FIG. 17 is a flowchart showing an example of a search mode process according to the embodiment.

The search mode process will be described with reference to the flowchart shown in FIG. 17.

In step S701, the control circuit 110 of the control device 100 determines whether a search target is an inspection target. When it is an inspection target, the process moves to step S702. In step S702, the control circuit 110 searches for an inspection target on the basis of user's input. After that, the process moves to step S708.

In step S701, when the search target is not an inspection target, the process moves to step S703. In step S703, the control circuit 110 determines whether the search target is an inspection sound. When it is an inspection sound, the process moves to step S704. In step S704, the control circuit 110 searches for an inspection sound on the basis of user's input. For example, an inspection sound is input by picking up a hammering sound by the sound pickup device 200. In the search using an inspection sound, sound characteristics of, e.g. a resonant sound, a non-resonant sound, a high-pitched sound and a low-pitched sound can be input as text. The control circuit 110 searches for inspection sounds corresponding to these input sound characteristics. After that, the process moves to step S708.

In step S703, when the search target is not an inspection sound, the process moves to step S705. In step S705, the control circuit 110 determines whether the search target is a determination result. When it is not a determination result, the process moves to step S706. In step S706, the control circuit 110 causes the display device 400 to display, for example, an error indicating that no search target is specified. After that, the search mode process is ended, and the process returns to the main control.

In step S705, when the search target is a determination result, the process moves to step S707. In step S707, the control circuit 110 searches for a determination result on the basis of user's input. After that, the process moves to step S708.

In step S708, the control circuit 110 causes the display device 400 to display a picture 705 showing a search result as shown in FIG. 16, for example. The user looks at the picture 705 and is able to know that a determination result for bolt 3 is a non-resonant sound. The user is also able to know that data of the inspection sound and the inspection target image is recorded. In the present embodiment, in the next process described below, the inspection sound or the image can be reproduced according to a user's request.

More specifically, in step S709, the control circuit 110 determines whether an instruction to reproduce the inspection sound or the image is given. When the instruction is not given, the process moves to step S711. On the other hand, when the instruction is given, the process moves to step S710. In step S710, the control circuit 110 reproduces the inspection sound or causes the display device 400 to display the image.

In step S711, the control circuit 110 determines whether the display on the display device 400 or the reproduction of the inspection sound is ended. When it is not ended, step S711 is repeated. When it is ended, the search mode process is ended, and the process returns to the main control.

The above-described search mode process allows a user to know the inspection results that were recorded in the past. If the past inspection results are referred to, the inspection efficiency can be improved. If, furthermore, the past inspection results are easily read out, the past recording can easily be compared with the current status.

The above-described example is an example of searching for an inspection result file on the basis of an inspection target, an inspection sound and an inspection result. However, the present invention is not limited to this example. For example, if a message saying "the inspection result of this year differs from that of the last year" is input, these results can be compared and a different inspection result can be displayed.

(Advantages of Recording System)

In the recording system 10 according to the present embodiment, necessary information is recorded from sound data obtained by the sound pickup device 200, using a voice recognition technology or the like. In particular, a language portion that is significant as a language and a significant sound portion that is significant as a sound are extracted and thus when information about a sound itself and information about a language both need to be recorded, the advantages will be brought about.

Text information is created based on the language sound and then recorded. In other words, a user need not use his or her hands when he or she inputs information. If, furthermore, this input is combined with a display using the display device 400 that is a head mount display, the user can use both hands freely. In other words, hands-free input of sound and text can be achieved. Therefore, input efficiency of inspection or the like is improved, as is the entire operation efficiency of inspection or the like. As described above, according to the recording system 10, text information and sound information can be recorded appropriately based upon sound input only.

As in the present embodiment, an instruction to obtain an image by the image pickup device 300 can be also controlled by voice input. Thus, hands-free input of image data as well as sound data and text data can be achieved.

Figure 5:
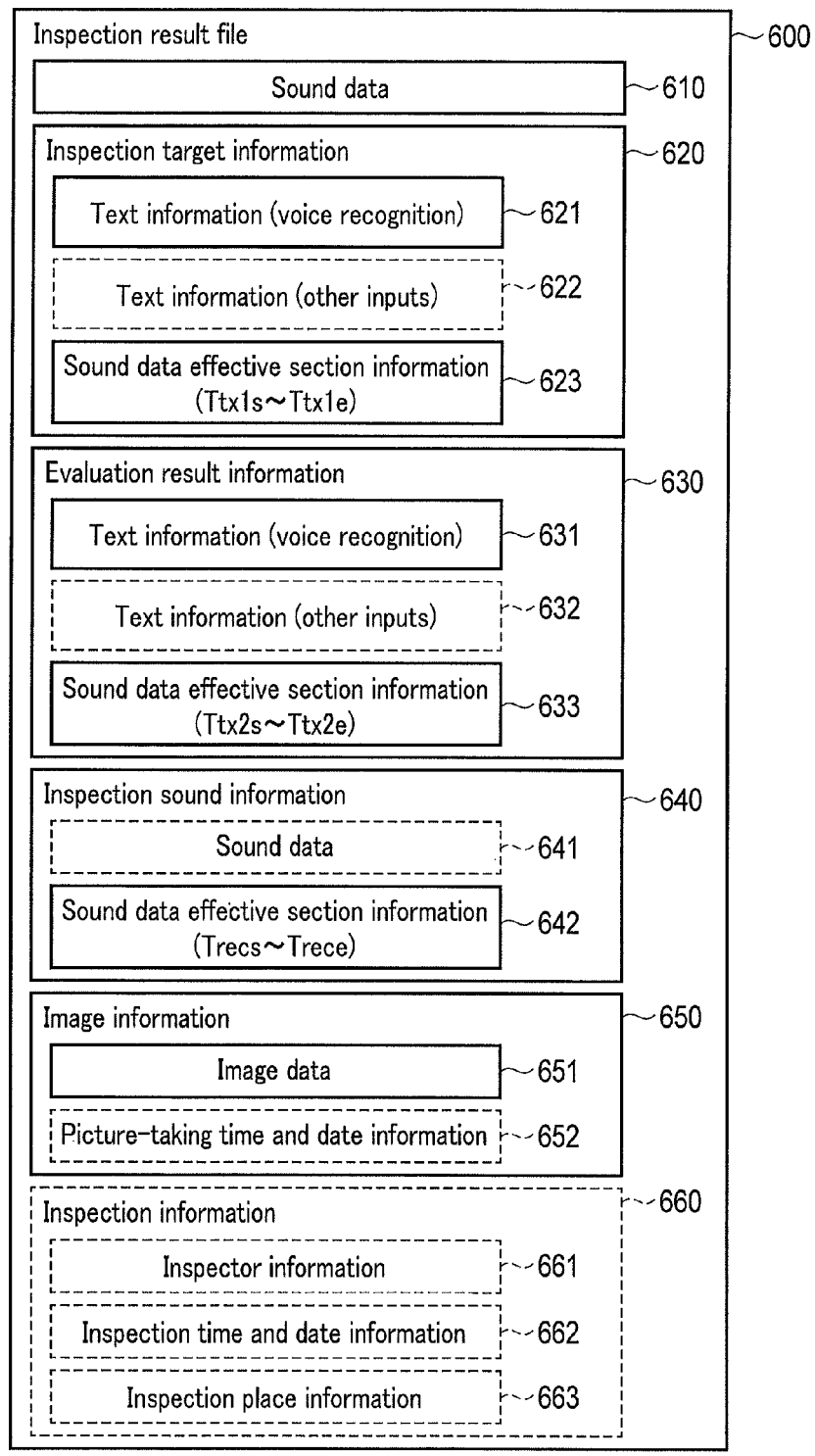
FIG. 5 is a schematic view showing an example of a configuration of an inspection result file according to the embodiment.

Input information items are sorted according to the formats set in accordance with inspection items as shown in, e.g. FIG. 5 and thus necessary information items are arranged appropriately. Since necessary information items are arranged and recorded, a document having a fixed format can easily be prepared in making a report or the like.

In the recording system 10 according to the present embodiment, the display device 400 clearly displays uninput items of a plurality of inspection items. Thus, a situation in which no necessary items for inspection are recorded can be prevented.

When voice input is used particularly as in the recording system 10 of the present embodiment, the clear display of uninput items particularly brings about an advantage. In other words, unlike the case where a user writes text or the like or chooses a check box with his or her hand, in the case of voice input, it is not essential for the user to confirm a display visually at the time of input. Therefore, at the time of voice input, a user does not pay attention to a display but an inspection target and the like. It is thus likely that no necessary item will be input. In contrast, the recording system 10 according to the present embodiment allows a user to recognize an uninput item visually because information items are clearly arranged and displayed on the display device 400.

Since necessary information items are recorded together in one file as in the present embodiment, information items that are meaningful as a group of information items, such as an inspection result, can easily be handled. This is important when the information items are used under the environment other than the environment under which they are diffused and assumed on the Internet. This technique is very important when a user opens an inspection file on the Internet to ask opinions from an indefinite number of well-informed persons or when a user collects information of big data from an indefinite number of inspectors. A tampering prevention system can be applied to the file.

(Modification)

The foregoing embodiment shows an example in which a group of information items recorded in one file includes sound data, text data and image data. However, the present invention is not limited to this example. The group of information items need not include at least one of these data. For example, it does not include image data but may include sound data and text data only. In this case, the recording system 10 need not include the image pickup device 300 or the image processing circuit 140.

The foregoing embodiment also shows an example in which the display device 400 displays an uninput item when the uninput item is presented to a user. However, the present invention is not limited to this example. For example, a user can be presented with an uninput item or the fact that there is an uninput item by voice, vibration or the like. The user can be presented by whatever method. Furthermore, the user can be presented by a presentation control unit corresponding to the display control unit 118.

The foregoing embodiment also shows an example in which the sound data obtained by the sound pickup device 200 is processed in real time. However, the present invention is not limited to this example. For example, on the basis of sound data that is recorded in advance, a voice recognition process can be performed and its result can be input to the inspection result file 600. In other words, part of the control device 100 can serve as a single unit. Assume that sound data is separately recorded in advance and thus stored in a recording medium or the like.

On the basis of this sound data, the sound processing circuit 130 extracts an inspection sound, text information, etc. The control circuit 110 stores the extracted inspection sound, text information, etc. in, e.g. the storage device 160.

In the foregoing embodiment, the recording system 10 is described as a device for recording necessary items. However, it may have a function of making a document in which the recorded items are arranged in a predetermined form.

In the foregoing embodiment, an example of a hammering test for civil engineering structures is described. However, the use of the recording system 10 is not limited to the hammering test. The recording system 10 can be used for various inspections of industrial products and the like, various types of surveillance and the like, and diagnosis in the medical fields and the like. Sounds of heartbeats, breath, percussion, etc. can be used as the inspection sound, and a result of doctor's diagnosis, patient's words, etc. can be used as the text information. Furthermore, the recording system 10 can be utilized for mobile devices generally used as hobbies and tastes, and also used for recording songs of birds, types of the birds and the like. The recording is not essential, but the above technology can be applied to a technology of getting a language portion of a sound as a clue and determining the meaning of the other portion of the sound to pick up an important sound and analyze the sound.

In the foregoing embodiment, the structural components of the recording system 10, such as the control device 100, sound pickup device 200, image pickup device 300 and display device 400 are separated from one another. However, some or all of the structural components can be formed integrally as one unit.

Of the technologies described in the above embodiment, the control described chiefly with reference to the flowcharts can be performed using programs, but these functions can be replaced with a dedicated circuit. For example, a section that extracts a specific sound pattern and converts it to text information or replaces it with other information can be formed of an electronic circuit. Moreover, a section over various languages need not be processed on a standalone basis by mobile device or the like, but can be processed by linking with a network. The programs can be stored in, e.g. various recording mediums as well as the storage device 160. There are different methods of recording the programs in the storage device 160, recording mediums or the like. The programs can be recorded at the time of product shipment or using a distributed recording medium or using a download via the Internet.

The flowcharts of the foregoing embodiment are one example, and various modifications can be made to the flowcharts. For example, the order of the steps shown in each of the flowcharts can be changed as appropriate, some of the steps can be deleted, and another step can be added.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control device for a recording system comprising:
a sound acquisition control circuit that acquires sound data from a sound pickup device;
a recording control circuit that includes a memory that records information based on the sound data as recording information corresponding to one of predetermined targets;
an item management control circuit that identifies a particular target from the one of the predetermined targets, in which the recording information has not yet been recorded; and
a presentation control circuit that controls a display, wherein
when in an inspection mode, the control device:
displays, on the display, an image of the particular target,
acquires, using the sound pickup device, sound data of the particular target,
creates text information based on the sound data acquired by the sound pickup device,
stores the sound data of the particular target and the text information in the memory;
when in a search mode, the control device:
retrieves information for a search target from the memory, and
displays, on the display, the information for the search target retrieved from the memory.

2. The control device according to claim 1, wherein the memory includes a term database including candidates for the text information,
wherein the control device creates the text information using the term database.

3. The control device according to claim 2, wherein when in the inspection mode, the control device further:
searches the term database for the text information to locate a plurality of candidate words, and
displays, on the display, the plurality of candidate words; and
wherein the text information stored in the memory is a particular candidate selected from the plurality of candidate words.

4. The control device according to claim 1, wherein when in the inspection mode, the control device further:
determines whether the sound data acquired by the sound pickup is from the target, and
creates the text information on a condition the sound data acquired by the sound pickup is not from the target.

5. The control device according to claim 1, wherein when in the inspection mode, the control device further:
extracts a significant sound portion that is a significant sound included in the sound data of the target, and
stores, in the memory, information about the significant sound portion and the text information in association with each other.

6. The control device according to claim 5, wherein the control device stores the information about the significant sound portion and the text information in one file.

7. A control device for a recording system comprising:
an imager that acquires image data;
a sound acquisition control circuit that acquires sound data from a sound pickup device;
a recording control circuit that includes a memory that records information based on the sound data as recording information corresponding to one of predetermined targets;
an item management control circuit that identifies a particular target from the one of the predetermined targets, in which the recording information has not yet been recorded; and
a presentation control circuit that controls a display,
wherein
when in an inspection mode, the control device:
displays, on the display, an image of the particular target,
acquires, using the sound pickup device, sound data of the particular target,
stores the sound data of the particular target in the memory;
extracts a language portion that is included in the sound data and significant as a language and a significant sound portion that is a portion other than the language portion and significant as a sound; and
stores, in the memory, information about the language portion, information about the significant sound portion, and the image data in association with one another;

when in a search mode, the control device:
retrieves information for a search target from the memory, and
displays, on the display, the information for the search target retrieved from the memory.

8. The control device according to claim 1, wherein, when in the inspection mode, the control device further:
extracts a language portion that is included in the sound data and significant as a language and a significant sound portion that is a portion other than the language portion and significant as a sound, and
stores, in the memory, information about the language portion and information about the significant sound portion in one file in association with each other.

9. A recording system comprising:
the control device according to claim 1;
the sound pickup device; and
the display.

10. A recording device comprising:
a communication interface that is communicatively coupled to a display and a sound pickup device that acquires sound data;
a memory that stores information based on the sound data as recording information corresponding to one of predetermined items;
a processor that is communicatively coupled to the communication interface and the memory,
wherein, when in an inspection mode, the processor is configured to:
display, on the display, an image of a target,
acquire, using the sound pickup device, sound data of the target,
create text information based on the sound data acquired by the sound pickup device,
store the sound data of the target and the text information in the memory; wherein when in a search mode, the processor is configured to:
retrieve information for a search target from the memory, and
display, on the display, the information for the search target retrieved from the memory.

* * * * *